Dec. 17, 1946. A. V. BEDFORD 2,412,669
PULSE-ECHO POSITION INDICATOR
Filed June 19, 1942 2 Sheets-Sheet 1
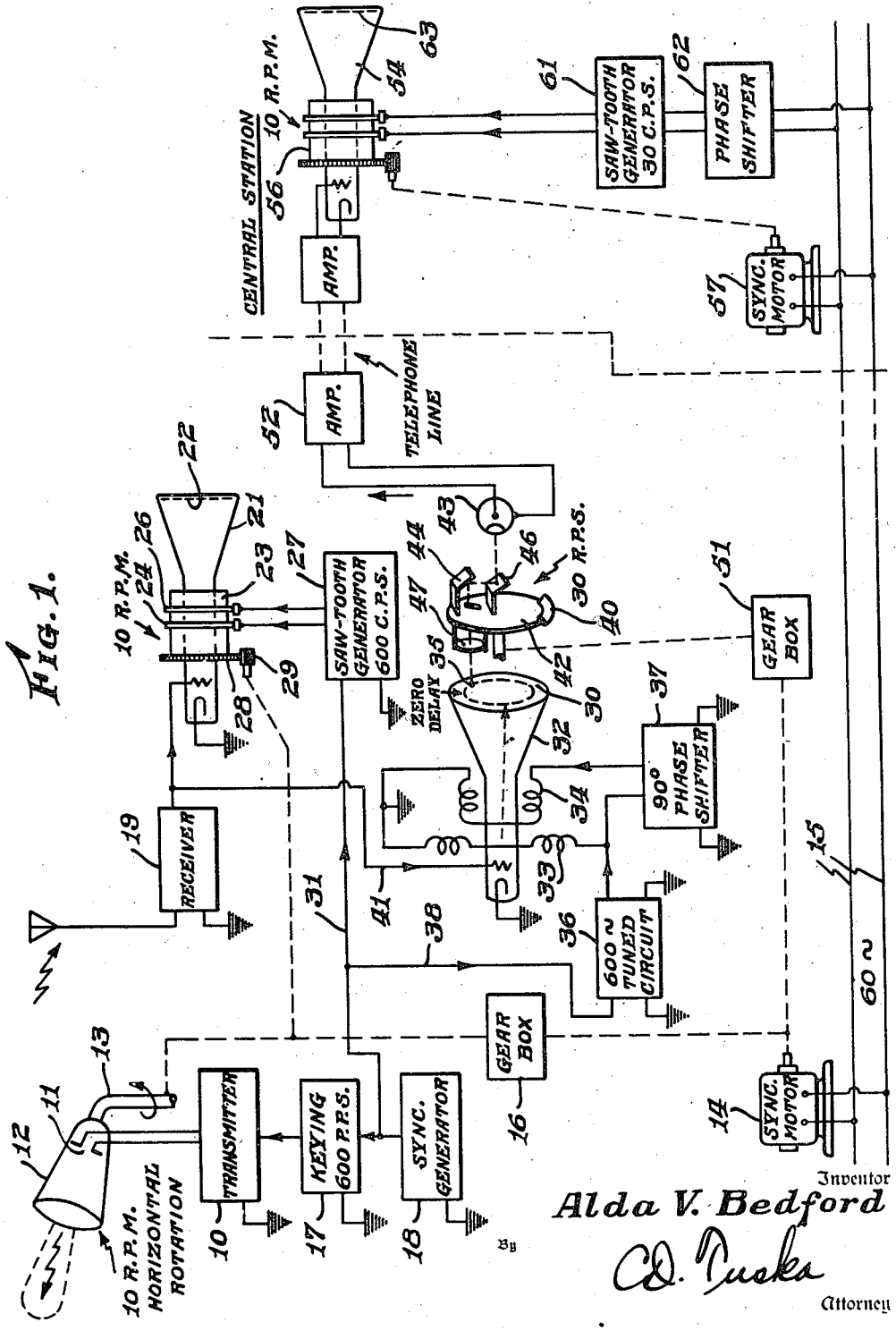
Inventor
Alda V. Bedford
By C. D. Tuska
Attorney Dec. 17, 1946.  A. V. BEDFORD  2,412,669
PULSE-ECHO POSITION INDICATOR
Filed June 19, 1942  2 Sheets--Sheet 2
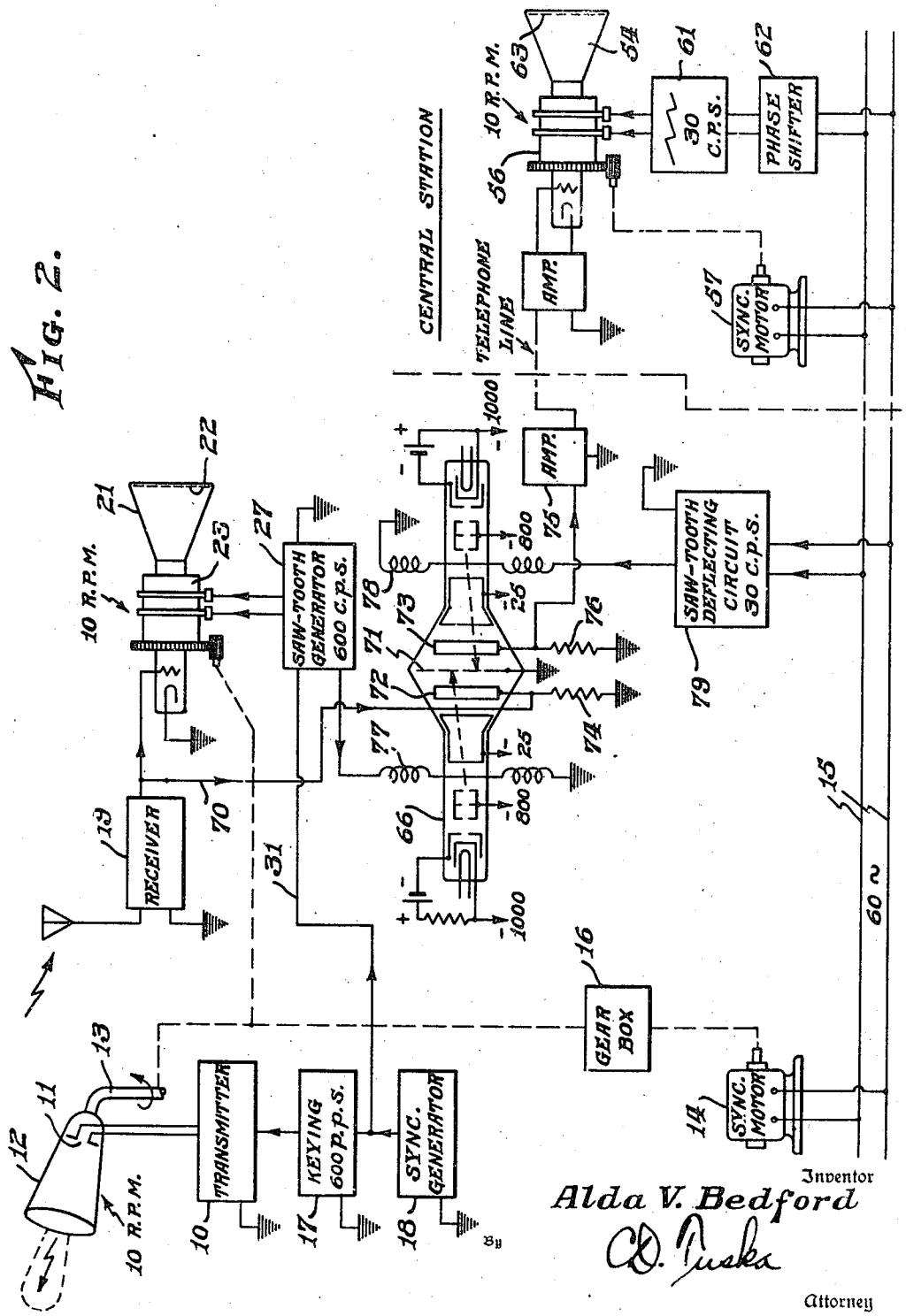
Inventor
Alda V. Bedford
Attorney Patented Dec. 17, 1946

2,412,669

UNITED STATES PATENT OFFICE 2,412,669

PULSE-ECHO POSITION INDICATOR

Alda V. Bedford, Collingswood, N. J., assignor to Radio Corporation of America, a corporation of Delaware Application June 19, 1942, Serial No. 447,630

5 Claims. (Cl. 250—1)

My invention relates to pulse-echo position indicating systems and particularly to systems adapted to convey the position information to a remote point or central station. The invention is hereinafter described as applied to a position indication system in which a directive transmitting antenna is rotated horizontally to sweep a radio beam through a horizontal plane while pulsing the beam. The radio pulse is reflected if it strikes an airplane or the like. The reflected pulse is picked up by a receiver located near the pulse transmitter and the distance of the reflecting object is determined by the time elapsed between transmission and reception of the pulse. The direction of the reflecting object is determined also by employing at the receiver a cathode ray indicator tube in which the cathode ray is rotated in synchronism with the rotation of the transmitting antenna and is swept radially to establish a distance coordinate.

It may be desirable to install a plurality of stations of the above-described type spaced apart the proper distance to give protection over a large geographical area. In that case it may be desirable to convey the information from all pulse-echo stations to a central station where one person has before him a view of all the position-indicating views or patterns that are present at the individual stations. A difficulty in doing this is that such information ordinarily occupies a fairly wide frequency band, from 600 to 60,000 cycles per second, for example. This band is too wide for transmission over the usual telephone, telegraph or other wire line.

An object of the present invention is to provide a method of and means for reducing the above-mentioned frequency band, preferably enough to permit transmission of the position indication information over a wire line to a central station.

Another object of the invention is to provide an improved method of and means for conveying information from a radio pulse-echo position indicator to a remote point.

Another object of my invention is to reduce the amplitude of the noise in the signal of reduced frequency as compared with the original signal.

In one embodiment of my invention the position indication at the remote station appears on a cathode ray tube provided with a deflecting yoke that is rotated in synchronism with the rotation of the transmitter antenna. The radial deflection produced by this yoke is at a low frequency rate as compared with the rate at the indicator tube located at the transmitter; these rates being 30 per second and 600 per second, respectively, in the example described below. The signal for pulsing or modulating the cathode ray of the indicator tube at the remote station (this signal corresponding to the reflected pulses applied to the indicator tube at the transmitter) is obtained by applying the received reflected pulses to a second cathode ray tube at the transmitter to store them on a fluorescent screen and by deflecting the cathode ray of this tube circularly at the pulse rate. The resulting stored pulse at a point on the circular trace is scanned by a single aperture disc rotating at the low-frequency radial-deflection rate employed at the remote indicator tube. When the scanning disc aperture comes opposite the light spot on the circular trace, a pulse of light is transmitted to a photoelectric cell to produce a corresponding electrical pulse. These pulses may be transmitted over an ordinary wire line to the cathode ray tube indicator at the remote station since their repetition rate in the example assumed is 30 per second instead of 600 per second as at the transmitter station with a corresponding reduction in the frequency band.

In another embodiment of the invention, the frequency reduction is obtained by employing a cathode ray storage tube in place of the scanning disc and by scanning circularly the storage tube. The pulse signal is stored on a mosaic by means of a cathode ray that is deflected at the high-frequency rate, such as 600 per second. It is taken off the mosaic by means of a cathode ray that is deflected at the low-frequency rate, such as 30 per second.

The invention will be better understood from the following description taken in connection with the accompanying drawings in which Fig. 1 is a diagram of a pulse-echo position indicator system embodying the invention, and Fig. 2 is a diagram of another embodiment of the invention. Like parts in the two figures are indicated by similar reference numerals.

Referring to Fig. 1, a radio transmitter 10 is keyed at the rate of 600 pulses per second, for example, to radiate pulses of very short duration from a suitable directive antenna 11. Antenna 11 may be a dipole in a parabolic reflector 12 or it may be of any other suitable design. It is rotated at 10 rotations per minute, for example, in a horizontal plane about a vertical shaft 13. The shaft 13 is driven by a synchronous motor 14 through a gear box 16, the mechanical coupling being indicated by the broken lines. The motor 14 is connected to a 60-cycle power line

15. Suitable pulse-keying means 17 is driven by a synchronizing-pulse generator 18.

The receiver 19, which is located in the vicinity of the transmitter, responds to the reflected pulses of carrier-wave frequency, demodulates them, and applies them to the control electrode of a cathode-ray indicator tube 21 having a fluorescent screen 22. Tube 21 is provided with a rotatable deflecting yoke 23 of the magnetic type having slip rings 24 and 26 which are connected through brushes to a sawtooth generator 27. The yoke 23 is rotated synchronously with the antenna rotation by means of gears 28 and 29 mechanically coupled to the gear box 16.

The sawtooth generator 27 is synchronized with the radio-pulse transmission by means of pulses from the synchronizing generator 18 supplied over a conductor 31. The deflecting wave applied to the yoke 23 contains a direct current component such that the deflection of the cathode ray is from the center of screen 22 toward the circumference. Since the cathode-ray tube 21 is biased to beam-current cutoff in the absence of a received pulse, or at least to less than maximum beam current, a luminous spot appears on the screen 22 upon the reception of a pulse. This spot has a circumferential position depending upon the direction of the reflecting object from the rotating transmitter antenna and has a radial position (distance from center of screen) depending upon the distance of said object from the transmitter antenna.

If an attempt were made to transmit the reflected pulse, which recurs at 600 times per second, to a remote station over an ordinary wire line it would be found that the fidelity of transmission would be very poor as the telephone line would not transmit the required frequency band. Therefore, I have provided means for reducing the frequency band required whereby information sent over a telephone line to a central station will give on the indicator tube an acceptable indication of the position of the airplane or other reflecting object.

The frequency-band reducing means comprises a cathode ray tube 32 having a fluorescent screen 30. Circular deflection of the cathode ray is provided by means of two pairs of deflecting coils 33 and 34 positioned at right angles to each other. Coils 33 and 34 are supplied, from a suitable source 36, with sine wave current having a frequency of 600 cycles per second, the current in coils 34 being shifted 90 degrees with respect to that in coils 33, by means of a phase shifter 37.

The 600-cycle sine wave current is synchronous with the keying pulses. In the example shown it is produced by supplying the 600-cycle pulses from the synchronizing pulse generator 18 over a conductor 38 to the sine-wave source 36. The source 36 may be simply a circuit tuned to 600 cycles per second. The tuned circuit converts the pulses into sine waves which may be amplified or the pulses may be amplified before conversion.

The tube 32 may be (but is not necessarily) biased to beam cutoff so that a spot of light 35 appears on the screen 30 when a reflected pulse is applied to the control electrode of tube 32 over a conductor 41. This light spot appears at a point on the path of circular deflection indicated by the dotted circular trace and at a position determined by the time that the reflected pulse appears upon the control electrode.

A rotatable disc 42 having a single aperture which preferably is a radial slit is located opposite the screen 30, and centered with respect to the circular deflection. In order to direct light from the spot 35 to a photoelectric cell 43, two mirrors 44 and 46 are mounted on the disc 42, one opposite the disc aperture and the other at the disc axis. A lens system 47 in front of the disc aperture images the light spot 35 thereon. Counterbalancing means for the disc is shown at 40. The disc 42 is rotated at a comparatively low speed which may be a submultiple of the pulse rate, this being 30 rotations per second in the example illustrated whereby the frequency band is reduced to $30/600$ or $1/20$ of the original band width. It may be driven through a gear box 51 by the synchronous motor 14. The pulse output of the photoelectric cell 43 is amplified by an amplifier 52 and transmitted over a wire line to the central station.

At the central station there is a cathode ray indicator tube 54 which, like the tube 21, is provided with a rotatable deflecting yoke 56 that is rotated in synchronism with the antenna rotation. This may be done by a synchronous motor 57 that is supplied with power from the same 60 cycle line 15 that supplies power to the motor 14. A sawtooth deflecting wave recurring 30 times per second is produced in the yoke 56 by a sawtooth wave generator 61 to deflect the cathode beam radially. The generator 61 is held in fixed time relation to the pulse transmission by connecting it to the 60-cycle power line 15 through a phase shifter 62. It will be understood that at the indicator tubes 21 and 54 the sawtooth sweep is so phased with respect to the transmitter pulse that the deflection starts from the center of the fluorescent screen at the instant the pulse is transmitted. The fluorescent screen of the tube 54 is indicated at 63.

The persistence of fluorescence of the screen 63 and the screen 22 of tube 21 should be several seconds, preferably six seconds where the yoke rotates 10 R. P. M. or once in 6 seconds. The persistence of fluorescence of the screen 30 of the tube 32 should be at least $1/600$ second (the time of one circular deflection) and preferably is about $1/30$ second in the example shown for good signal to noise ratio. The fluorescence decays gradually, as is well known, but a satisfactory screen is one in which the light falls to one-half maximum intensity in $1/30$ second.

From the foregoing it will be apparent that the pulse produced in the photoelectric cell 43 occurs at a time following the instant of pulse transmission which is measured by time taken for the disc aperture to rotate from the "0-delay" position indicated on the screen 30 to the position of the spot of light 35. Thus the 30-cycle pulses sent over the wire line to the central station have a time delay with respect to the instant of pulse transmission that corresponds accurately to the delay between pulse transmission and pulse reception at receiver 19. The radial position indication on the indicator tube 54 will be the same as on the indicator tube 21.

In Fig. 2 the frequency band reduction is obtained by means of a cathode-ray storage tube 66 of the general type shown in Schroter Patent 2,175,573, issued October 10, 1939. The specific tube construction illustrated is the same as that shown in Beers Patent 2,273,172, issued February 17, 1942. The tube 66 is a double-tube construction in which a highly evacuated envelope contains oppositely-disposed electron guns, each of which may be of conventional construction including the usual cathode control electrode, first anode and second anode.

The tube includes the so-called double-sided mosaic indicated at 71 and collecting electrodes 72 and 73 on opposite sides thereof. The collecting electrodes 72 and 73 may be in the form of rings whereby they may collect secondary electrons from the mosaic 71 without being struck by the electron beams as the mosaic is scanned. The double-sided mosaic screen 71 may be any of several well-known constructions. For example, it may be constructed in accordance with the teachings of Patent No. 2,045,984, filed February 28, 1934, in the name of Leslie E. Flory and assigned to Radio Corporation of America.

Preferably the mosaic 71 is operated slightly positive with respect to the second anode. In the example illustrated, the mosaic is connected to ground while the second anodes are 25 volts negative and the other electron gun electrodes are operated at suitable negative potentials with respect to ground, as indicated. Specific voltages are given on the drawings merely by way of example.

The cathode ray in the left hand section of tube 66 is deflected along a line on the mosaic 71 at the rate of 600 deflections per second by means of deflecting coils 77 connected to the sawtooth generator 27. The cathode ray in the right hand section of tube 66 is deflected along this same line on the mosaic at the rate of 30 deflections per second by means of deflecting coils 78 connected to a sawtooth generator 79 which may be synchronized from the power line 15.

The collecting electrode 72, which may be connected to ground through a resistor 74, functions as the input control electrode and is connected to the output circuit of the receiver 19 through a conductor 70. The collector electrode 73, which may be connected to ground through a resistor 76, functions as the signal output electrode to supply the signal of reduced band width to the wire line through an amplifier 75.

The operation of the delay tube 66 is substantially as follows: Simultaneously with the scanning of the mosaic 71 by the electron beam produced in the left hand portion of the tube the received reflected pulse is supplied over the conductor 70 and is impressed upon the electrode 72 to vary its potential in accordance with said pulse whereby the individual capacity elements of the mosaic acquire electrostatic charges in accordance with the amplitude of the applied signal. It will be understood that the capacity elements of the mosaic 71 acquire different charges in this manner because the electrode 72 collects more or less secondary electrons from them depending upon its potential.

Thus a pulse signal is stored on the mosaic 71 and may be taken off at any time by causing the electron beam produced in the right hand end of the tube to scan the other side of the mosaic 71. As this other side of the mosaic 71 is scanned, secondary electrons are released from the mosaic and collected by the electrode 73 whereby the pulse signal appears across the resistor 76. It will be understood that this output signal is produced because the number of secondary electrons going from a picture or capacity element of the mosaic 71 to the collector electrode 73 depends upon the potential difference between them, this depending upon the charge of the individual picture or capacity element.

From the foregoing description it will be apparent that pulses are supplied to the telephone line which recur 30 times per second and which occur at a time following the instant of pulse transmission which time depends upon the position of the stored pulse on the mosaic 71. Therefore, as the cathode ray of tube 64 is deflected outwardly from the center of screen 69, the ray is unblocked or modulated to produce a spot of light at a distance from said center which represents the distance of the reflecting airplane or the like from the rotating antenna 11. The direction of the reflecting object from the antenna 11 is shown by the circumferential position of the light spot just as in the system of Fig. 1.

It may be noted that, in addition to reducing the frequency band, the use of my invention improves the signal to noise ratio since the reflected pulses occur and are stored in a definite phase relation whereas noise pulses occur in a random time relation.

I claim as my invention:

1. In a radio system, means for transmitting pulses to an object whereby they are reflected from said object, said pulses recurring at a certain rate, means for receiving said reflected pulses in the region of the transmitting means, there being a certain time interval between the instant of transmission of a pulse and the reception of said pulse, means for converting said reflected pulses to pulses which recur at a submultiple frequency of said certain rate with each pulse of said submultiple frequency occurring at a certain time interval following a time reference instant, said last-mentioned time interval being equal to said submultiple times said first-mentioned time interval, a cathode ray indicator tube having a beam control element, means for applying said submultiple pulses to said control element, and means for deflecting the cathode ray of said indicator tube at said submultiple frequency with the start of each deflection beginning at said time reference instant.

2. In a radio system, means for transmitting pulses to an object whereby they are reflected from said object, said pulses recurring at a certain rate, means for receiving said reflected pulses in the region of the transmitting means, there being a certain time interval between said transmission and reception, a cathode ray tube having a storage screen and means for directing a cathode ray against said screen, means for deflecting the cathode ray along said screen at said certain rate, means for modulating said cathode ray by said reflected pulses whereby an image thereof is stored on said screen, means for scanning said screen at a frequency lower than said certain rate, and means for simultaneously taking signals off said screen at said lower frequency to produce pulses at said lower rate, a cathode ray indicator tube having a beam control element, means for applying said pulses occurring at the lower rate to said control element, and means for deflecting the cathode ray of said indicator tube at said lower frequency.

3. A system for reducing the frequency band required to transmit the information contained in a wave consisting of electrical pulses recurring periodically at a certain rate each of which occurs at a certain time after the occurrence of a time reference pulse, said system comprising a cathode ray tube having a fluorescent screen which has a certain persistence of fluorescence, means for modulating the cathode ray of said tube by said first pulses, means for deflecting said cathode ray at said certain rate whereby there is stored on said screen an image of said first pulses with said image spaced from a time reference point by an amount determined by said deflection rate, optical means for scanning the image on said screen at a lower rate than said certain rate, and means for simultaneously taking signals off said screen at said lower scanning rate for converting said stored image to pulses recurring at said lower rate.

4. In a system for indicating the position of an object, means for transmitting pulses to said object from a rotating directional antenna whereby they are reflected from said object, said pulses recurring at a certain pulse repetition rate, means in the region of the transmitting means for receiving said reflected pulses, there being a certain time interval between the instant of transmission of a pulse and the reception of said pulse, means for converting said reflected pulses to pulses which recur at a lower rate than said certain pulse repetition rate with each pulse of said lower rate occurring at a time interval following a time reference instant which interval is equal to the ratio of said certain pulse repetition rate to said lower rate times said first time interval, a cathode ray tube including electron beam producing means, means for applying said lower rate pulses to said tube to modulate said beam, means for radially deflecting the electron beam of said tube, means for rotating the plane of said radial deflection in synchronism with the rotation of said antenna, and means for producing said radial deflection at said lower rate with the deflection from center starting substantially at said time reference instant.

5. In a system for indicating the position of an object, means for transmitting pulses to said object from a rotating directional antenna whereby they are reflected from said object, said pulses recurring at a certain pulse repetition rate, means in the region of the transmitting means for receiving said reflected pulses, there being a certain time interval between said transmission and reception, a cathode-ray tube having a storage screen and means for directing a cathode ray against said screen, means for modulating said cathode ray of said tube by said received pulses, means for deflecting said cathode ray at said pulse repetition rate whereby there is stored on said screen an image of said received pulses with said image spaced from a time reference point by an amount that is a function of said certain time interval, means for scanning said time reference point and the image on said screen at a lower scanning rate than said pulse repetition rate, and means for simultaneously taking signal off said screen at said lower scanning rate for converting said stored image to pulses recurring at said lower rate, a cathode ray indicator tube, means for applying the pulses occurring at said lower rate to said tube to modulate said beam, means for radially deflecting the electron beam of said indicator tube, means for rotating the plane of said radial deflection in synchronism with the rotation of said antenna, and means for producing said radial deflection at said lower scanning rate with the deflection from center starting substantially at the instant of scanning said time reference point.

ALDA V. BEDFORD.